(12) United States Patent
Kato (10) Patent No.: US 11,195,439 B2
(45) Date of Patent: Dec. 7, 2021

(54) HEAD-UP DISPLAY APPARATUS (71) Applicant: JVCKENWOOD CORPORATION, Yokohama (JP)

(72) Inventor: Toshiyuki Kato, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/001,408

(22) Filed: Aug. 24, 2020

(65) Prior Publication Data
US 2020/0388200 A1 Dec. 10, 2020

Related U.S. Application Data

(63) Continuation of application No. PCT/JP2019/007719, filed on Feb. 28, 2019.

(30) Foreign Application Priority Data

Jun. 1, 2018 (JP) .............................. JP2018-105782

(51) Int. Cl.
| | | |
|---|---|---|
| *G06F 3/038* | (2013.01) | |
| *G09G 5/00* | (2006.01) | |
| *G09G 3/00* | (2006.01) | |
| *B60K 35/00* | (2006.01) | |

(Continued)

(52) U.S. Cl.
CPC .............. *G09G 3/001* (2013.01); *B60K 35/00* (2013.01); *G02B 27/0101* (2013.01); *G02B 27/48* (2013.01); *B60K 2370/1529* (2019.05); *B60K 2370/23* (2019.05); *G02B 2027/0141* (2013.01);

(Continued)

(58) Field of Classification Search
CPC ........................... G09G 3/3413; B01J 2523/00
See application file for complete search history.

(56) References Cited

U.S. PATENT DOCUMENTS

| | | | | |
|---|---|---|---|---|
| 5,148,023 A | * | 9/1992 | Hayashi ................ | G01J 1/4228 250/372 |
| 2011/0073773 A1 | * | 3/2011 | Labrot .............. | B32B 17/10761 250/461.1 |
| 2015/0286120 A1 | | 10/2015 | Ohno et al. | |

(Continued)

FOREIGN PATENT DOCUMENTS

| | | |
|---|---|---|
| JP | 2015-054628 A | 3/2015 |
| JP | 2015-059969 A | 3/2015 |

(Continued)

*Primary Examiner* — Nan-Ying Yang
(74) *Attorney, Agent, or Firm* — Procopio, Cory, Hargreaves & Savitch LLP (57) ABSTRACT

The present invention provides a head-up display apparatus capable of properly presenting information to a wide area. A head-up display apparatus includes: an image light output unit configured to output a first image display light formed by a visible light laser and a second image display light formed by an ultraviolet light laser; a screen that diffuses and transmits the first image display light, and transmits the second image display light without diffusing the second image display light; and a mirror that reflects the first and the second image display lights transmitted through the screen towards a windshield that presents a virtual image to a user by reflecting the visible light laser and presents a real image to the user by receiving the ultraviolet light laser and emitting light by itself.

4 Claims, 8 Drawing Sheets

(51) Int. Cl.
   *G02B 27/01* (2006.01)
   *G02B 27/48* (2006.01)
(52) U.S. Cl.
   CPC ..... *G09G 2354/00* (2013.01); *G09G 2380/10* (2013.01)

(56) References Cited

U.S. PATENT DOCUMENTS

2016/0147074 A1   5/2016   Kobayashi et al.
2018/0024359 A1*  1/2018   Yoneyama ............. B60K 35/00
                                                345/9

FOREIGN PATENT DOCUMENTS

WO   2014/103093 A1   7/2016
WO   2016/147486 A1   9/2016

\* cited by examiner

VIDEO IMAGE PRESENTATION RANGE

RANGE IN WHICH FIRST IMAGE DATA IS DRAWN USING VISIBLE LIGHT

VIDEO IMAGE PRESENTATION RANGE

RANGE IN WHICH SECOND IMAGE DATA IS DRAWN USING ULTRAVIOLET LIGHT

HEAD-UP DISPLAY APPARATUS

CROSS REFERENCE TO RELATED APPLICATION

This application is a Bypass Continuation of PCT/JP2019/007719 filed on Feb. 28, 2019, which is based upon and claims the benefit of priority from Japanese patent application No. 2018-105782, filed on Jun. 1, 2018, the disclosure of which is incorporated herein in its entirety by reference.

BACKGROUND

The present invention relates to a head-up display apparatus.

The head-up display apparatus displays a virtual image several meters in front of a driver of a vehicle. Thus, it is possible for the driver to visually recognize various information pieces even if the driver does not greatly move the position of his/her line of sight or the position of his/her focal point when he/she is looking ahead, such as during driving. For example, Patent Literature 1 discloses a head-up display apparatus including an intermediate image forming unit that forms a real image based on an image display light projected from an image projection unit, in which the intermediate image forming unit controls the direction of a principal ray of the image display light transmitted through the intermediate image forming unit.

However, in the head-up display apparatus disclosed in Patent Literature 1 (Japanese Unexamined Patent Application Publication No. 2015-059969), an eye box (a range in which the driver can see a virtual image) is limited. Accordingly, in the above head-up display apparatus, it is difficult for a passenger other than the driver to see a virtual image, and it is difficult for even the driver to see the virtual image in a state other than the state in which he/she is looking ahead.

Further, Patent Literature 2 (Japanese Unexamined Patent Application Publication No. 2015-054628) discloses that image information emitted from projection means by a mirror is reflected toward the windshield of a vehicle at a predetermined angle to thereby display a virtual image, and a real image is displayed on a screen provided on the dashboard.

SUMMARY

However, in the head-up display apparatus disclosed in Patent Literature 2, the number of optical components for dividing optical paths into an optical path for displaying a real image and an optical path for displaying a virtual image increases. Further, in the head-up display apparatus disclosed in Patent Literature 2, a virtual image and a real image are presented at positions different from each other when viewed from a driver. This leads to a problem that for example, when information presented to the driver is switched from a virtual image display to a real image display, the driver is less likely to notice the information. Further, the real image is displayed on a screen on the dashboard. This leads to a problem that it becomes difficult for a fellow passenger of a vehicle to see the real image depending on, for example, the orientation of the screen.

A head-up display apparatus according to an embodiment includes: an image light output unit configured to output a first image display light formed by a visible light laser and a second image display light formed by an ultraviolet light laser; a screen that diffuses and transmits the first image display light, and transmits the second image display light without diffusing the second image display light; and a mirror that reflects the first and the second image display lights transmitted through the screen towards a video image presentation plate that presents a virtual image to a user by reflecting the visible light laser and presents a real image to the user by receiving the ultraviolet light laser and emitting light by itself.

DETAILED DESCRIPTION

First Embodiment

Embodiments of the present invention will be described hereinafter with reference to the drawings.

In the following description, it is assumed that a head-up display apparatus according to this embodiment is mounted on a dashboard of an automobile. Note that the head-up display apparatus may be attached to a vehicle other than an automobile or means of transportation other than a vehicle.

Further, in the following description, the direction of the automobile on which the head-up display apparatus is mounted is a reference direction. That is, in the following description, the windshield side is the front and the driver side is the rear of the automobile. Similarly, the roof side of the automobile is the upper side thereof, the ground side is the lower side thereof, and the horizontal direction (the right-and-left direction) of the automobile is the lateral side thereof.

Figure 1:
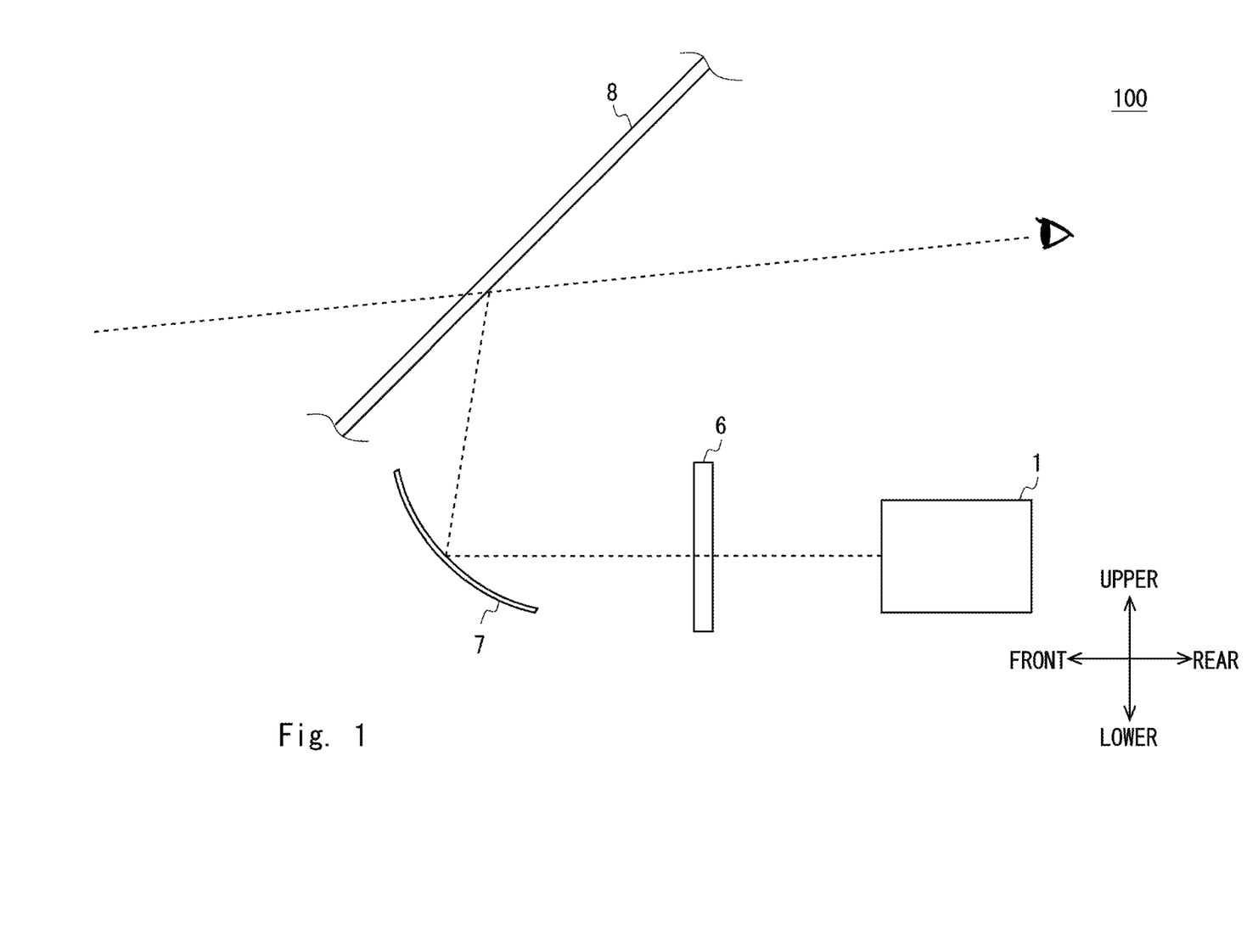
FIG. 1 is a side view schematically showing a configuration of a head-up display apparatus according to a first embodiment of the present invention.
Figure 2:
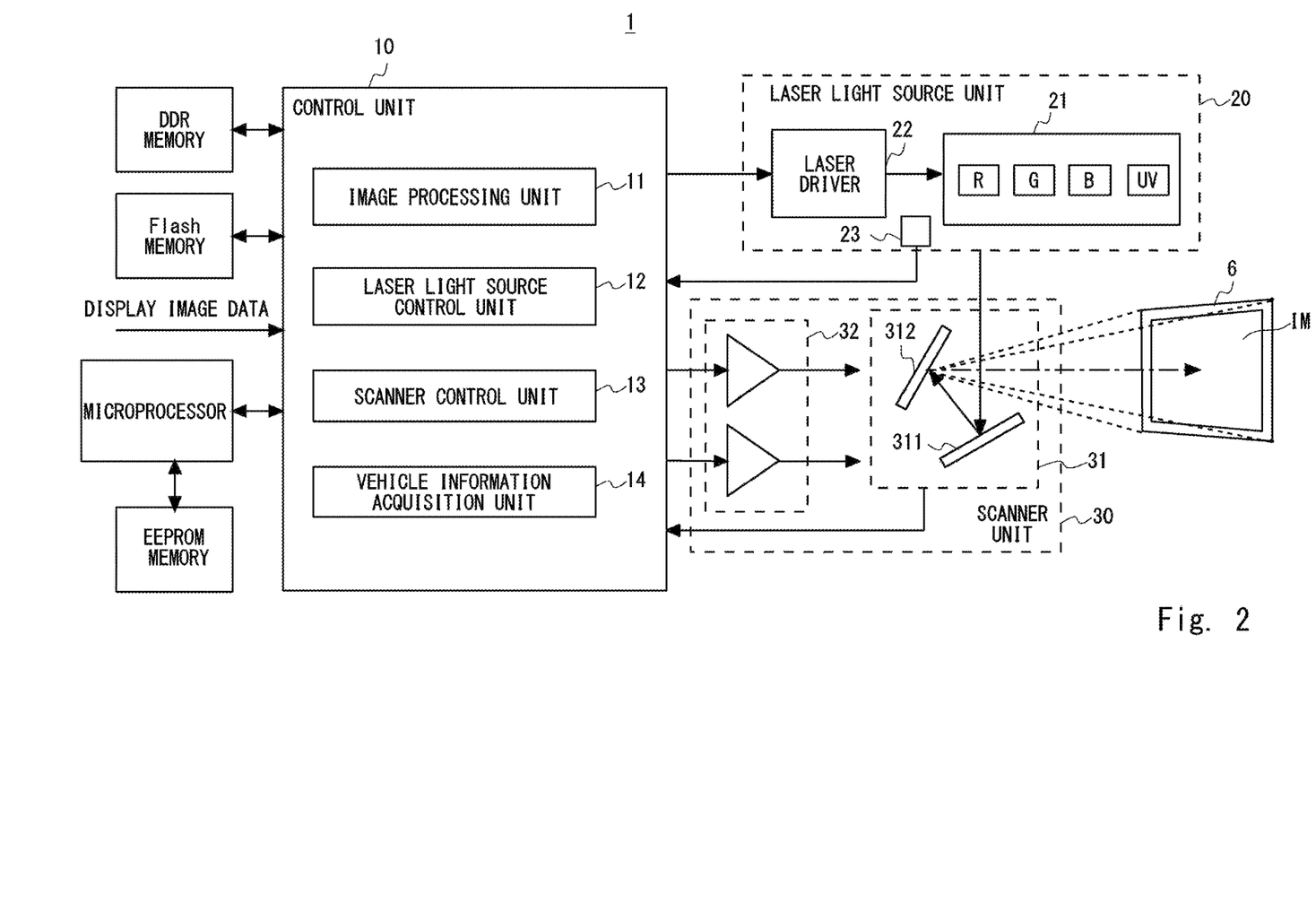
FIG. 2 is a block diagram showing a configuration of an image light output unit of the head-up display apparatus according to the first embodiment of the present invention.
Figure 3:
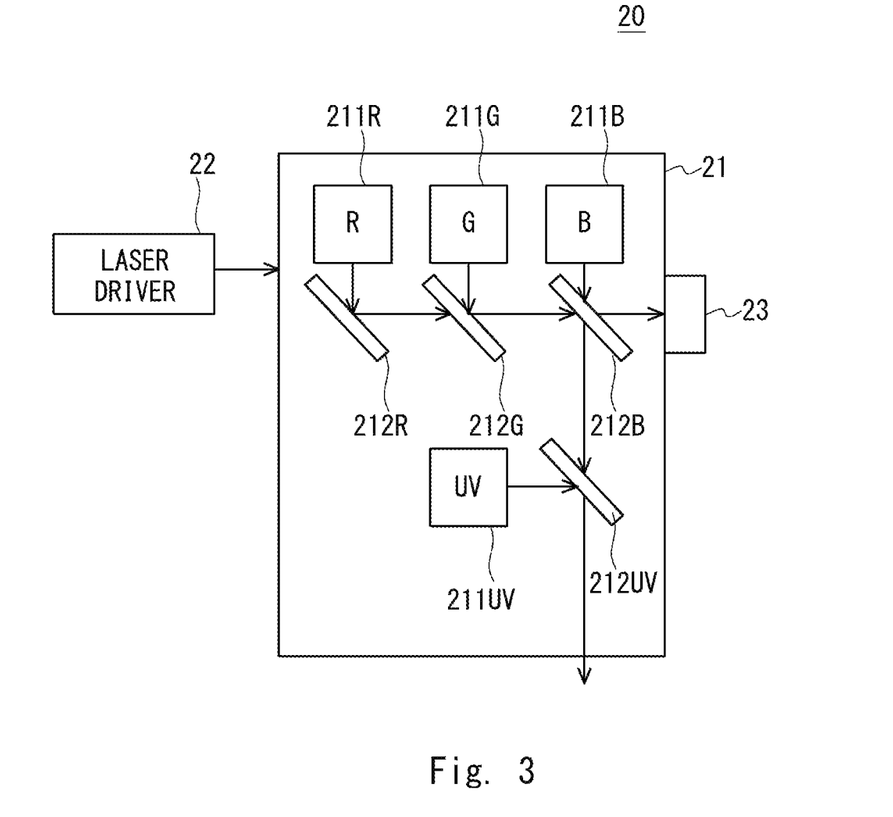
FIG. 3 is a block diagram showing a configuration of a laser light source unit of the head-up display apparatus according to the first embodiment of the present invention.
Figure 4:
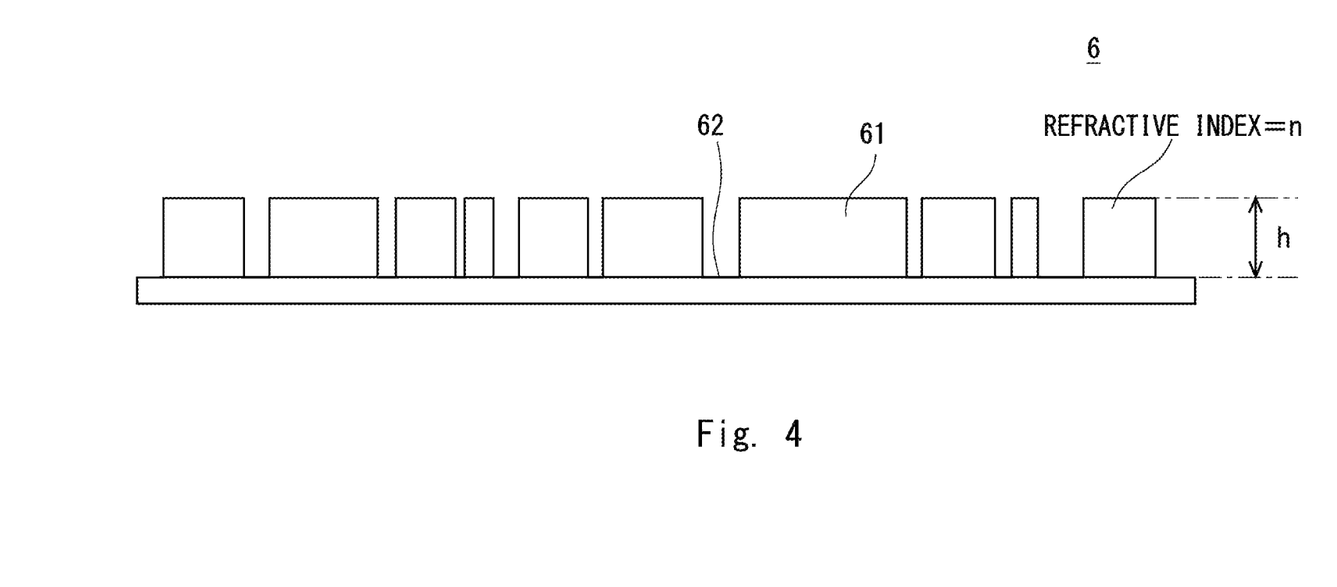
FIG. 4 is a cross-sectional view showing an example of a screen of the head-up display apparatus according to the first embodiment of the present invention.
Figure 5:
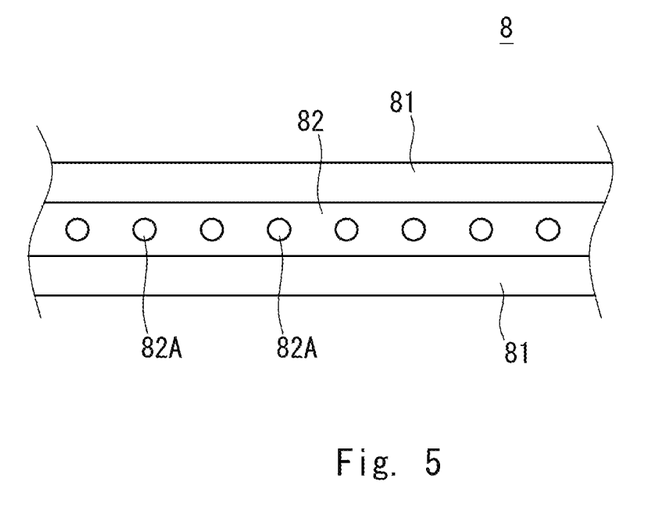
FIG. 5 is a cross-sectional view showing an example of a windshield according to the first embodiment of the present invention.

A configuration of a head-up display apparatus 100 is described in detail with reference to FIGS. 1 to 5. FIG. 1 is a side view schematically showing the configuration of the head-up display apparatus 100 according to the first embodiment. Further, FIG. 2 is a block diagram showing a configuration of an image light output unit 1 of the head-up display apparatus 100. Further, FIG. 3 is a block diagram showing a configuration of a laser light source unit 20 of the head-up display apparatus 100. Further, FIG. 4 is a cross-sectional view showing an example of a screen 6 of the head-up display apparatus 100. Further, FIG. 5 is a cross-sectional view showing an example of a windshield 8. Note that in FIGS. 4 and 5, hatching showing a cross section is omitted.

As shown in FIG. 1, the head-up display apparatus 100 includes the image light output unit 1, the screen 6, a mirror 7, and the like, and projects an image display light onto the windshield 8 serving as a video image presentation plate. The head-up display apparatus 100 may include a video image presentation plate in addition to the image light output unit 1, the screen 6, the mirror 7, and the like.

The image light output unit 1 outputs a first image display light formed by a visible light laser and a second image display light formed by an ultraviolet light laser.

Specifically, as shown in FIG. 2, the image light output unit 1 includes a control unit 10, the laser light source unit 20, a scanner unit 30, and the like.

The laser light source unit 20 controlled by the control unit 10 outputs the first image display light formed by the visible light laser and the second image display light formed by the ultraviolet light laser. Further, the scanner unit 30 controlled by the control unit 10 reflects the first and the second image display lights output by the laser light source unit 20 toward the screen 6 and scans them. By doing so, a display image IM (an intermediate image) based on the first image display light formed by the visible light laser is drawn on the screen 6. Further, the screen 6 transmits the first image display light formed by the visible light laser and the second image display light formed by the ultraviolet light laser. Details of the screen 6 will be described later.

The laser light source unit 20 includes a laser module 21 that outputs a laser light, a laser driver 22 that drives a laser diode included in the laser module 21, a photodiode 23 that measures the amount of laser light, and the like.

As shown in FIG. 3, the laser module 21 includes a red laser diode 211R, a green laser diode 211G, a blue laser diode 211B, an ultraviolet laser diode 211UV, and dichroic mirrors 212R, 212G, 212B, and 212UV corresponding to the laser diodes 211R, 211B, 211G, and 211UV, respectively. The laser lights of the respective colors output from the laser diodes 211 are multiplexed by the dichroic mirrors 212, and then output to the scanner unit 30.

The dichroic mirror 212R has a characteristic of reflecting approximately 100% of the light having a red wavelength output from the red laser diode 211R.

The dichroic mirror 212G has a characteristic of transmitting approximately 100% of the light having a red wavelength output from the red laser diode 211R and reflecting approximately 100% of the light having a green wavelength output from the green laser diode 211G.

Examples of characteristics of the dichroic mirror 212B include a characteristic of reflecting about 98% of the light having a red wavelength output from the red laser diode 211R and about 98% of the light having a green wavelength output from the green laser diode 211G, and transmitting about 2% of each of these lights. Further, the examples of characteristics of the dichroic mirror 212B includes a characteristic of transmitting about 98% of the light having a blue wavelength output from the blue laser diode 211B and reflecting about 2% of this light.

The dichroic mirror 212UV has a characteristic of transmitting approximately 100% of the lights having a red wavelength and a green wavelength reflected by the dichroic mirror 212B and approximately 100% of the light having a blue wavelength transmitted through the dichroic mirror 212B, and reflecting approximately 100% of the ultraviolet light output from the ultraviolet laser diode 211UV.

By this configuration of the dichroic mirror 212, about 98% of each of the visible lights (the laser light having a red wavelength, the laser light having a green wavelength, and the laser light having a blue wavelength) output from the laser diodes 211 is made incident on the scanner unit 30, and about 2% of each of the visible lights is made incident on the photodiode 23. Further, about 100% of the ultraviolet light output from the laser diode 211 is made incident on the scanner unit 30.

The laser driver 22 drives the laser diodes 211 based on a laser drive signal from the control unit 10.

The photodiode 23 measures the amount of incident laser light and outputs a result of the measurement to the control unit 10.

Note that the configurations of the laser diodes 211 and the dichroic mirrors 212 are not limited to those shown in FIG. 3, and any configuration can be adopted as long as the respective outputs from these diodes and mirrors to the scanner unit 30 and the photodiode 23 are performed in a manner similar to those performed by the laser diodes 211 and the dichroic mirrors 212 according to the configurations shown in FIG. 3.

The scanner unit 30 includes, for example, a scanner (a scanning mirror unit) 31 that reflects the laser light output from the laser light source unit 20 and scans it, a scanner driver 32 that drives the scanner 31, and a scan angle detection unit (not shown) that detects a scan angle of the scanner 31.

The scanner 31 includes a vertical mirror 311 that reflects laser light and scans it in a vertical direction, a horizontal mirror 312 that reflects laser light and scans it in a horizontal direction, and the like. The vertical mirror 311 and the horizontal mirror 312 are configured by a micro electro mechanical system (MEMS) mirror and the like.

The scanner driver 32 drives the scanner 31 based on a scanner drive signal from the control unit 10.

When the scanner 31 is configured by the vertical mirror 311 and the horizontal mirror 312, in general, the vertical mirror 311 operates at a scan angle and an oscillation frequency controlled by the scanner driver 32, and the horizontal mirror 312 operates at a scan angle and a oscillation frequency due to resonance since the oscillation frequency is high. Note that the horizontal mirror 312, like the vertical mirror 311, may operate at the scan angle and the oscillation frequency controlled by the scanner driver 32.

The control unit 10 includes an image processing unit 11 serving as an image input unit, a laser light source control unit 12, a scanner control unit 13, a vehicle information acquisition unit 14, and the like. The control unit 10 is configured by, for example, a Field Programmable Gate Array (FPGA). Further, each unit included in the image light output unit 1 is controlled by operating in accordance with the hardware language written in the control unit 10 in advance.

Note that the control unit 10 may include an arithmetic unit (not shown), a storage unit (not shown), and the like, and all processes performed by the control unit 10 may be implemented by the arithmetic unit executing a program stored in the storage unit. In this case, the program stored in the storage unit of each unit included in the control unit 10 includes a code for implementing the processing performed by each unit included in the control unit 10 by being executed by the arithmetic unit. Note that the storage unit includes, for example, the above program and any storage device capable of storing various information pieces used for processing performed by the control unit 10. The storage device is, for example, a memory. Further, the components of the control unit 10 are not necessarily implemented by software such as a program and may instead be implemented by a combination of any hardware, firmware, and software.

Further, the above-described programs may be stored and provided to the control unit 10 using any type of non-transitory computer readable media. Non-transitory computer readable media include any type of tangible storage media. Examples of the non-transitory computer readable media include magnetic recording media (e.g., flexible disks, magnetic tapes, and hard disk drives), optical magnetic recording media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, RAM (Random Access Memory)).

Further, the programs may be provided to the control unit 10 using any type of transitory computer readable media. Examples of transitory computer readable media include electric signals, optical signals, and electromagnetic waves. Transitory computer readable media can provide the programs to the control unit 10 via a wired communication line (e.g., electric wires, and optical fibers) or a wireless communication line.

The image processing unit 11 adjusts, for example, the shape and the brightness of drawing for input display image data and inputs the image data to the laser light source control unit 12. Specifically, the image processing unit 11 inputs, to the laser light source control unit 12, first image data for forming the first image display light and second image data for forming the second image display light. Note that the second image data is image data different from the first image data, or the same image data as the first image data. For example, the image processing unit 11 inputs data of an image showing a traveling state of the automobile as the first image data, and data of an image showing a warning as the second image data.

The display image data input to the image processing unit 11 is input from an external device (not shown). The external device generates display image data to be displayed by the head-up display apparatus 100 and outputs it to the image processing unit 11. The external device is, for example, a car navigation device, a control device of an automobile via a Control Area Network (CAN), or the like. Further, the external device may be an external terminal such as a smartphone or a tablet terminal. Further, the display image data may be generated by the head-up display apparatus 100.

The navigation device outputs traveling direction information (a right turn, a left turn, travelling straight ahead, etc.), distance information to a destination, and the like. The control device of the automobile outputs traveling speed information of the automobile, and the like. The external terminal outputs information about the presence or absence of incoming telephone calls/mail of the telephone function and the mail function. When the external terminal includes a navigation application, the external terminal outputs traveling direction information from the navigation application, distance information to the destination, and the like. These information pieces may be input to the image processing unit 11 as digital data indicating a numerical value, a character string or the like, or may be input to the image processing unit 11 as digital data forming a video image. Further, the display image data may include a captured image captured by a side camera or a rear camera.

The laser light source control unit 12 outputs a laser drive signal based on the first image data and the second image data to the laser driver 22 and controls the outputs of the laser diodes 211. By doing so, the laser light source control unit 12 controls the outputs of the first and the second image display lights by the laser light source unit 20. Specifically, the laser light source control unit 12 controls driving of the red, the blue, and the green laser diodes 211R, 211B, and 211G, respectively, and the ultraviolet laser diode 211UV in accordance with the color and the brightness of a drawing image based on the image data generated by the image processing unit 11. Further, the laser light source control unit 12 performs Auto Power Control (APC) processing. In the APC processing, the laser light source control unit 12 evaluates the state of the laser light source unit 20 based on the intensity of the laser light detected by the photodiode 23, determines the driving current values of the laser diodes 211, and controls the laser driver 22.

Further, the laser light source control unit 12 may control the laser light source unit 20 so as to output the first and the second image display lights at timings different from each other.

Alternatively, the laser light source control unit 12 may control the output of the laser light source unit 20 so that the first and the second image display lights are presented at positions where they do not overlap each other in the windshield 8 and at timings when they overlap each other in time.

Further, if the state of the automobile is a state in which the driver needs to carefully look outside the automobile, the laser light source control unit 12 may control the laser light source unit 20 so as to output the first image display light, and if the state of the automobile is a state in which the driver does not need to carefully look outside the automobile, the laser light source control unit 12 may control the laser light source unit 20 so as to output the second image display light.

The scanner control unit 13 outputs a scanner drive signal to the scanner driver 32 and controls scanning of the laser light performed by the scanner 31. The scanner control unit 13 monitors a detection signal of the scan angle detection unit (not shown) that detects a scan angle of the scanner 31 and performs, for example, control of the scan angle, the waveform generation, and the oscillation frequency of the scanner 31.

The vehicle information acquisition unit 14 acquires information about a state of the automobile (hereinafter referred to as vehicle state information). For example, the vehicle information acquisition unit 14 acquires, as the vehicle state information, information for determining whether or not the state of the automobile is a state in which the driver of the automobile needs to carefully look outside the automobile. Specifically, the vehicle information acquisition unit 14 acquires information as to whether or not the automobile is in an automatic driving mode from the external device (not shown) such as the above-described control device of the automobile. Alternatively, the vehicle information acquisition unit 14 acquires information about the state of the automobile such as gear information, parking brake information, and current position information of the automobile.

The screen 6 diffuses and transmits the first image display light, and transmits the second image display light without diffusing the second image display light. That is, the screen 6 diffuses and transmits the visible light laser, and just transmits the ultraviolet light laser but does not diffuse the ultraviolet light laser. Further, the display image IM (the intermediate image) based on the first image display light formed by the visible light laser is drawn on the screen 6. Note that the display image IM is a real image displayed on the screen 6 by projecting the first image display light onto the screen 6. Specifically, as shown in FIG. 4, the screen 6 is a diffuser, and the angle at which the first image display light is diffused by the screen 6 is determined by the size and the focal length of the screen 6. Further, when the light incident on the screen 6 is laser light, speckle noise of the laser light is reduced.

Specifically, as shown in FIG. 4, the screen 6 is a plate-like member in which convex parts 61, each of which has a height h and a refractive index n, are randomly arranged on a surface opposite to the surface on which the laser light is made incident. Here, if the refractive index of air is $n_{air}$, the wavelength of the laser light output from the ultraviolet laser diode 211UV is $\lambda$, and m is a positive integer, each of the convex parts 61 formed on the surface of the screen 6 satisfies the following Expression (1). Note that $\lambda$, is, for example, 405 nm.

$$(n-n_{air}) \times h = m \times \lambda \tag{1}$$

The convex parts 61 satisfying the above Expression (1) are formed on the surface of the screen 6, so that the second image display light formed by the ultraviolet light laser is just transmitted by the screen 6 and is not diffused. Specifically, as the phase of the second image display light that has passed through each of the convex parts 61 is the same as that of the second image display light that has passed through a concave part 62 between the convex parts 61, the second image display light, that is, the ultraviolet light laser, is not diffused by the screen 6.

Meanwhile, the convex parts 61 satisfying the above Expression (1) are formed on the surface of the screen 6, so that the first image display light formed by the visible light laser is diffused and transmitted by the screen 6. Specifically, as the refractive index of each of the convex parts 61 is different from that of the concave part 62, the first image display light, that is, the visible light laser, is diffused by the screen 6. Note that in the above Expression (1), the refractive index of each of the convex parts 61 is n, and the refractive index of the concave part 62 is $n_{air}$.

The mirror 7 reflects the first and the second image display lights transmitted through the screen. Further, the mirror 7 enlarges the first and the second image display lights. The mirror 7 reflects the first and the second image display lights toward a video image presentation range of the windshield 8. The windshield 8 is disposed in the upper direction of the mirror 7. Therefore, the first and the second image display lights reflected by the mirror 7 are made incident on the windshield 8. Further, the mirror 7 has a function of reflecting the first image display light by the windshield 8 to thereby correct a distortion of a virtual image that is visually recognized by a user. It should be noted that the user includes at least a driver of an automobile and may include a fellow passenger of the automobile.

Further, a member (not shown) that changes an optical path of the light reflected by the mirror 7 may be attached to the mirror 7. The member (hereinafter referred to as the optical path changing unit) that changes reflection optical paths of the first and the second image display lights by driving the mirror 7. For example, the optical path changing unit includes a servo motor, a gear, and the like, and changes the direction of the mirror 7 by operating the servo motor, the gear, and the like. By doing so, the optical path changing unit can change the reflection optical paths of the first and the second image display lights by the mirror 7.

Further, the windshield 8 reflects the first image display light (the visible light laser) reflected by the mirror 7, thereby presenting a virtual image to a user. Further, the windshield 8 receives the second image display light (the ultraviolet light laser) reflected by the mirror 7 and emits light by itself, thereby presenting a real image to a user.

Specifically, as shown in FIG. 5, the windshield 8 includes, for example, two glass plates 81, and a self-luminous intermediate film 82 sandwiched between the two glass plates 81. The self-luminous intermediate film 82 contains a luminescent material 82A that is excited by ultraviolet light and emits fluorescent light. Further, the self-luminous intermediate film 82 has a property of transmitting light other than ultraviolet light.

The first image display light that is reflected by the mirror 7 and is made incident on the windshield 8 is reflected by the glass plate 81 to a driver. Then, the driver visually recognizes the virtual image based on the first image display light in a state in which the virtual image is superimposed on the scenery in front of the automobile. Note that depending on the position of a fellow passenger in the automobile, the fellow passenger can also visually recognize the virtual image.

Meanwhile, the self-luminous intermediate film 82 emits light by the second image display light that is reflected by the mirror 7 and is made incident on the windshield 8. Consequently, the driver and the fellow passenger can visually recognize the real image based on the second image display light on the windshield 8.

Further, the optical path of the first image display light from the image light output unit 1 to the windshield 8 and the optical path of the second image display light from the image light output unit 1 to the windshield 8 are substantially the same.

Figure 6A:
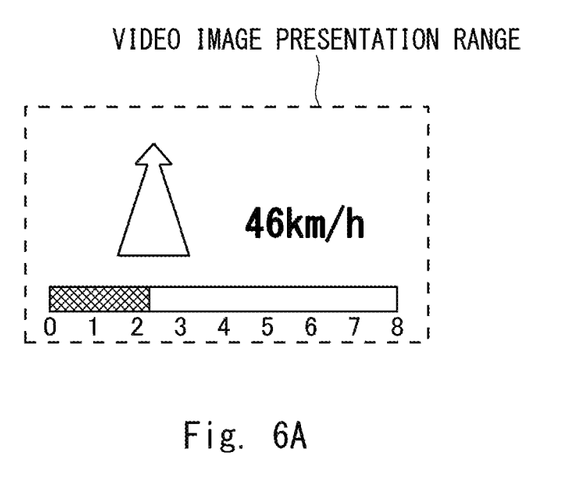
FIG. 6A is a diagram showing an example of a virtual image presented by the head-up display apparatus according to the first embodiment of the present invention.

For example, the first image display light is reflected by the windshield 8 to a driver, so that a virtual image showing a traveling speed or the like, which is a traveling state of the automobile, is displayed in the video image presentation range on the windshield 8 as shown in FIG. 6A.

Figure 6B:
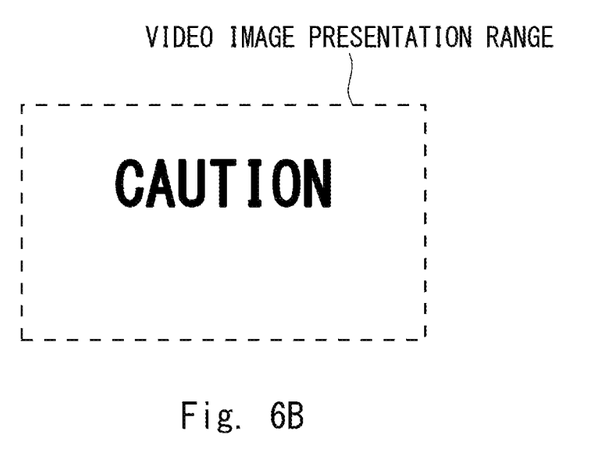
FIG. 6B is a diagram showing an example of a real image presented by the head-up display apparatus according to the first embodiment of the present invention.

Further, the self-luminous intermediate film 82 of the windshield 8 receives the second image display light and emits light by itself, so that a real image showing a warning "CAUTION" is displayed in the video image presentation range on the windshield 8 as shown in FIG. 6B.

In the examples shown in FIG. 6, the virtual image showing a traveling state of the automobile and the real image showing a warning are displayed at the same position in the video image presentation range on the windshield 8. In this case, the virtual image based on the first image display light shown in FIG. 6A and the real image based on the second image display light shown in FIG. 6B may be displayed in the video image presentation range on the windshield 8 at timings different from each other. Specifically, the image processing unit 11 inputs, to the laser light source control unit 12, data of an image showing a traveling state of the automobile as first image data, and data of an image showing a warning as second image data. Then, the laser light source control unit 12 controls the laser light source unit 20 so as to output the first and the second image display lights at timings different from each other.

Figure 7A:
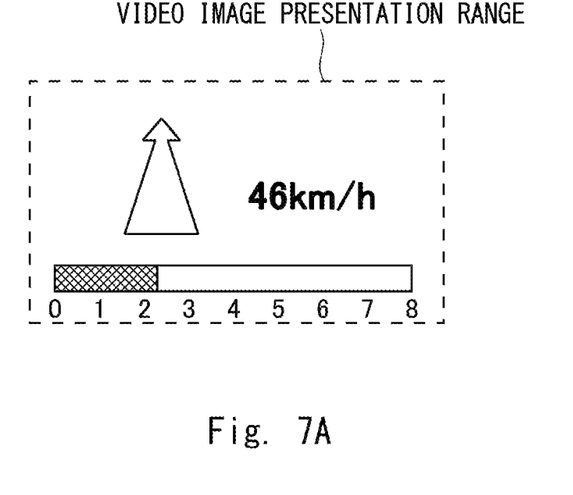
FIG. 7A is a diagram showing another example of the virtual image displayed by the head-up display apparatus according to the first embodiment of the present invention.

Further, in other examples shown in FIG. 7, the first image display light is reflected by the windshield 8 to a driver, so that a virtual image showing a traveling speed or the like, which is a traveling state of the automobile, is displayed in the video image presentation range on the windshield 8 as shown in FIG. 7A.

Figure 7B:
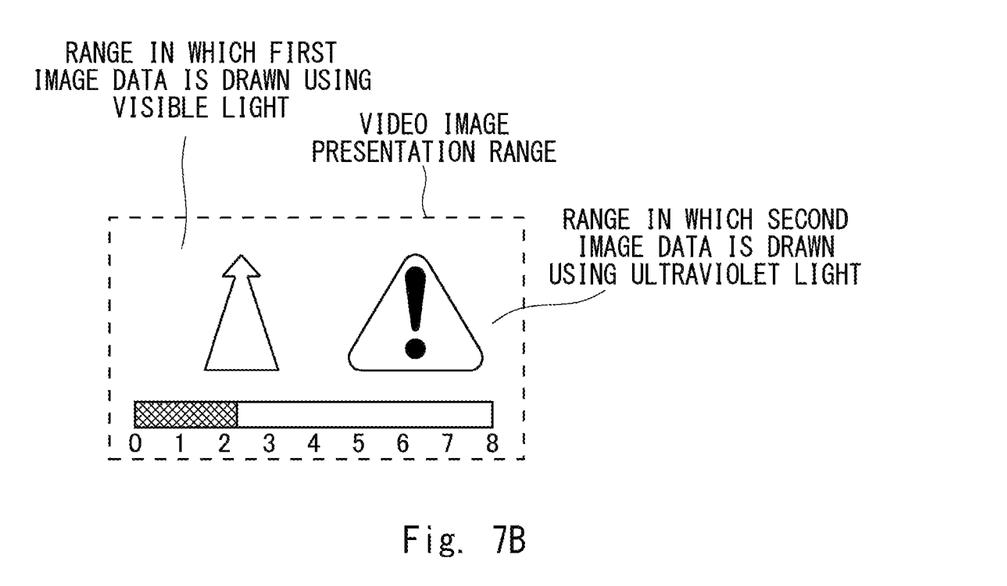
FIG. 7B is a diagram showing another example of the real image displayed by the head-up display apparatus according to the first embodiment of the present invention.

Further, the self-luminous intermediate film 82 of the windshield 8 receives the second image display light and emits light by itself, so that a real image showing a warning mark is displayed within the video image presentation range of the windshield 8 in which no virtual image is displayed as shown in FIG. 7B.

As described above, in the examples shown in FIG. 7, a virtual image showing a traveling state of the automobile and a real image showing a warning are displayed at positions where they do not overlap each other in the video image presentation range of the windshield 8. In other words, as shown in FIG. 7B, the video image presentation range on the windshield 8 is divided into a range in which the first image data is drawn by using the visible light laser and a range in which the second image data is drawn by using the ultraviolet light laser. In this case, the virtual image based on the first image display light shown in FIG. 7A and the real image based on the second image display light shown in FIG. 7B may be displayed in the video image presentation range on the windshield 8 at timings when they overlap each other in time. Specifically, the image processing unit 11 inputs, to the laser light source control unit 12, data of an image showing a traveling state of the automobile as first image data, and data of an image showing a warning as second image data. Then, the laser light source control unit 12 controls the output of the laser light source unit 20 so that the first and the second image display lights are presented at positions where they do not overlap each other in the windshield 8 and at timings when they overlap each other in time.

Figure 8:
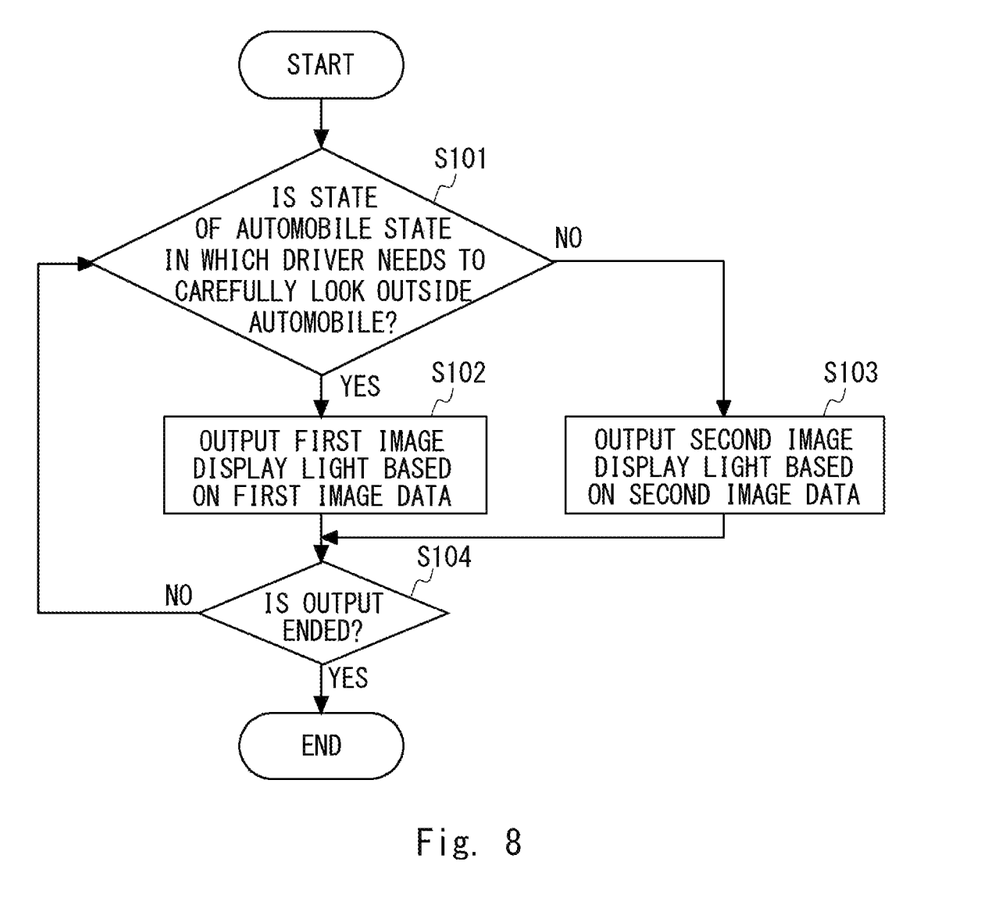
FIG. 8 is a flowchart showing an example of a method for displaying the virtual image and the real image by the head-up display apparatus according to the first embodiment of the present invention.

Further, when the first image data and the second image data input to the laser light source control unit 12 by the image processing unit 11 are the same image data, a virtual image based on the first image display light and a real image based on the second image display light that are displayed in the video image presentation range of the windshield 8 may be switched based on information (vehicle state information) about a state of the automobile acquired by the vehicle information acquisition unit 14 as shown in FIG. 8.

Specifically, first, the control unit 10 determines whether or not the state of the automobile is a state in which a driver needs to carefully look outside the automobile based on vehicle state information acquired by the vehicle information acquisition unit 14 (Step S101). Note that this determination may be performed by a component such as a state determination unit (not shown), which is implemented by processing performed by the control unit 10. The state in which a driver does not need to carefully look outside the automobile is one in which the automobile is in an automatic driving mode, that is, a state in which the automobile is not in a manual driving mode. Further, the state in which a driver does not need to carefully look outside the automobile is, for example, one in which the park gear is selected, or one in which the park gear is selected and the automobile is not currently on the road.

In Step S101, if the state of the automobile is a state in which a driver needs to carefully look outside the automobile (Yes in Step S101), the laser light source control unit 12 controls the laser light source unit 20 so as to output the first image display light (Step S102). By doing so, a virtual image based on the first image display light is displayed in the video image presentation range of the windshield 8.

In Step S101, if the state of the automobile is a state in which a driver does not need to carefully look outside the automobile (No in Step S101), the laser light source control unit 12 controls the laser light source unit 20 so as to output the second image display light (Step S103). By doing so, a real image based on the second image display light is displayed in the video image presentation range of the windshield 8.

Next, the laser light source control unit 12 determines whether to cause the laser light source control unit 20 to end the output of the laser light based on conditions under which the end of the presentation of the image can be determined, such as whether or not the image processing unit 11 has ended the inputs of the first image data and the second image data to the laser light source control unit 12 (Step S104).

In Step S104, if the laser light source unit 20 does not end the output of the laser light (No in Step S104), the process returns to Step S101.

In Step S104, if the laser light source unit 20 ends the output of the laser light (Yes in Step S104), this process is ended.

Note that even when the first image data and the second image data input to the laser light source control unit 12 by the image processing unit 11 are image data pieces different from each other and a virtual image based on the first image display light and a real image based on the second image display light are displayed in the video image presentation range of the windshield 8 at timings different from each other as shown in FIG. 6, the virtual image and the real image displayed in the video image presentation range of the windshield 8 may be switched based on vehicle state information as shown in FIG. 8.

The reason why a real image based on the second image display light is displayed in the image display range of the windshield 8 in a state in which a driver does not need to carefully look outside the automobile is that the position of the eye of the driver is often outside the eye box in the state in which the driver does not need to carefully look outside the automobile. For example, when a vehicle is traveling in an automatic driving mode, a driver does not often carefully look outside the vehicle. Further, while the vehicle is being parked, a driver often does not carefully look outside the vehicle. Carefully looking outside the vehicle herein means a state in which a driver is seated with his/her eyes directed to the front of the outside of the vehicle, that is, a state in which the driver can see a virtual image.

By the above-described head-up display apparatus 100 according to the first embodiment, the first image display light that is formed by the visible light laser output by the image light output unit 1 is diffused and transmitted by the screen 6, the second image display light that is formed by the ultraviolet light laser output by the image light output unit 1 is just transmitted by the screen 6 and is not diffused, and the first and the second image display lights transmitted through the screen 6 by the mirror 7 are reflected toward the windshield 8 that presents a virtual image to a user by reflecting the visible light laser and presents a real image to the user by receiving the ultraviolet light laser and emitting light by itself. Further, as the optical path of the first image display light from the image light output unit 1 to the windshield 8 and the optical path of the second image display light from the image light output unit 1 to the windshield 8 are substantially the same, the virtual image based on the first image display light and the real image based on the second image display light are displayed within the same video image presentation range. Accordingly, a driver can visually recognize both the virtual image based on the first image display light and the real image based on the second image display light even if he/she does not greatly move the position of his/her line of sight or the position of his/her focal point. Further, as the windshield 8 receives the second image display light and emits light by itself to thereby present a real image to a user, not only a driver but also a fellow passenger can visually recognize the real image. Thus, it is possible to provide the head-up display apparatus 100 capable of properly presenting information to a wide area.

Further, as the screen 6 diffuses and transmits the first image display light, it is possible to satisfactorily maintain the visibility of the virtual image based on the first image display light. Further, the screen 6 transmits the second image display light without diffusing the second image display light. Thus, it is possible to secure energy sufficient to prompt the windshield 8 to emit light by itself. Further, as the second image display light is not diffused by the screen 6, unnecessary parts of the windshield 8 are not made to emit light, whereby the visibility of the windshield 8 is not unnecessarily reduced.

Further, the image processing unit 11 inputs, to the laser light source control unit 12, first image data for forming the first image display light, and second image data for forming the second image display light, which is image data different from the first image data. Accordingly, it is possible to make information to be presented to a user by the virtual image based on the first image display light different from information to be presented to the user by the real image based on the second image display light, whereby it is possible to present information to the user so that he/she can more properly recognize it.

Further, the laser light source control unit 12 controls the laser light source unit 20 so as to output the first and the second image display lights at timings different from each other. Therefore, even if the information to be presented to the user by the virtual image based on the first image display light is different from the information to be presented to the user by the real image based on the second image display light, the visibility of each of the virtual image and the real image is not impaired.

Further, the laser light source control unit 12 controls the laser light source unit 20 to output the first and the second image display lights so that the first and the second image display lights are presented at positions where they do not overlap each other in the windshield 8 and at timings when they overlap each other in time. Therefore, even if the information to be presented to the user by the virtual image based on the first image display light is different from the information to be presented to the user by the real image based on the second image display light, the visibility of each of the virtual image and the real image is not impaired. Further, a user can confirm both the virtual image and the real image at a desired timing.

Further, the image processing unit 11 inputs data of an image showing a traveling state of the automobile as first image data, and data of an image showing a warning as second image data. Therefore, as more urgent warning information is displayed as a real image, not only a driver but also a fellow passenger can visually recognize the warning information.

Further, the vehicle information acquisition unit 14 acquires, as vehicle state information, information as to whether or not the state of the automobile is a state in which a driver of the automobile needs to carefully look outside the automobile. When the state of the automobile is a state in which the driver needs to carefully look outside the vehicle, the laser light source control unit 12 controls the laser light source unit 20 so as to output the first image display light, and when the state of the automobile is a state in which the driver does not need to carefully look outside the automobile, the laser light source control unit 12 controls the laser light source unit 20 so as to output the second image display light. Thus, it is possible for the driver to visually recognize a virtual image displayed in front of the automobile by carefully looking outside the automobile when he/she needs to carefully look outside the automobile, such as during manual driving. Further, it is possible for the driver and the fellow passenger to visually recognize a real image displayed on the windshield 8 when the driver does not need to carefully look outside the automobile, such as during automatic driving. If the driver does not need to carefully look outside the automobile, he/she may overlook a virtual image displayed in front of the automobile. However, by displaying a real image on the windshield 8, it is possible to present information to the driver and the fellow passenger so that they can properly recognize it.

Further, at this time, the first image data and the second image data input to the laser light source control unit 12 by the image processing unit 11 are the same image data, so that a user can properly visually recognize information both when a driver needs to carefully look outside the automobile, such as during manual driving, and when the driver does not need to carefully look outside the automobile, such as during automatic driving.

Further, even when the first image data and the second image data input to the laser light source control unit 12 by the image processing unit 11 are image data pieces different from each other, the virtual image and the real image that are displayed in the video image presentation range of the windshield 8 may be switched based on vehicle state information. By doing so, when a driver needs to carefully look outside the automobile, such as during manual driving, the driver can acquire information about a traveling state, such as a traveling speed required for travelling, by visually recognizing the virtual image displayed in front of the automobile. Further, when a driver does not need to carefully look outside the automobile, such as during automatic driving, the driver and the fellow passenger can acquire, for example, more urgent warning information by visually recognizing the real image displayed on the windshield 8.

Note that the present invention is not limited to the aforementioned embodiments and various modifications can be made without departing from the spirit of the present invention.

It is possible to provide a head-up display apparatus capable of properly presenting information to a wide area.

What is claimed is:

1. A head-up display apparatus, being mounted on a vehicle, comprising:
   a visible light laser configured to output a first image display light formed and an ultraviolet light laser configured to output a second image display light;
   a screen that diffuses and transmits the first image display light, and transmits the second image display light without diffusing the second image display light;
   a mirror that reflects the first and the second image display lights transmitted through the screen towards a video image presentation plate that presents a virtual image to a user by reflecting the visible light laser and presents a real image to the user by receiving the ultraviolet light laser and emitting light by itself;
   a memory configured to store a program; and
   a processor coupled to the memory, the visible light laser, and the ultraviolet light laser and configured to execute the program to:

acquire information about a state of the vehicle control outputs of the first and the second image display lights by the visible light laser and the ultraviolet light laser; and input first image data for forming the first image display light, and second image data for forming the second image display light, which is image data the same as the first image data, acquire information for determining whether or not the state of the vehicle is a state in which a driver of the vehicle need to carefully look outside the vehicle, when the state of the vehicle is a state in which the driver needs to carefully look outside the vehicle, control the visible light laser so as to output the first image display light, and when the state of the vehicle is a state in which the driver does not need to carefully look outside the vehicle, control the ultraviolet light laser so as to output the second image display light.

2. The head-up display apparatus according to claim 1, wherein the process is further configured to execute the program to control the visible light laser and the ultraviolet light laser so as to output the first and the second image display lights at timings different from each other.

3. The head-up display apparatus according to claim 1, wherein the process is further configured to execute the program to control the visible light laser and the ultraviolet light laser to output the first and the second image display lights so that the first and the second image display lights are presented at positions where they do not overlap each other in the video image presentation plate and at timings when they overlap each other in time.

4. The head-up display apparatus according to claim 1, wherein the process is further configured to execute the program to input the data of the image showing a traveling state of the vehicle or the data of the image showing a warning as the first image data and the second image data.

* * * * *